United States Patent
Fehling et al.

(10) Patent No.: US 9,176,218 B1
(45) Date of Patent: Nov. 3, 2015

(54) GAIN PROJECTION GEO-LOCATION SYSTEMS AND METHODS

(75) Inventors: Greg Fehling, Nashua, NH (US); Peter Dusaitis, Manchester, NH (US); Tyler Robinson, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 689 days.

(21) Appl. No.: 13/611,781

(22) Filed: Sep. 12, 2012

(51) Int. Cl.
| | |
|---|---|
| G01S 3/28 | (2006.01) |
| G01S 5/02 | (2010.01) |
| H01Q 3/26 | (2006.01) |
| G01S 5/06 | (2006.01) |
| G01S 3/46 | (2006.01) |
| G01S 3/38 | (2006.01) |
| H04B 7/08 | (2006.01) |

(52) U.S. Cl.
CPC .............. *G01S 5/0278* (2013.01); *G01S 3/38* (2013.01); *G01S 3/46* (2013.01); *G01S 5/0205* (2013.01); *G01S 5/06* (2013.01); *H01Q 3/26* (2013.01); *H04B 7/086* (2013.01); *H04B 7/0891* (2013.01)

(58) Field of Classification Search
None
See application file for complete search history.

(56) References Cited

U.S. PATENT DOCUMENTS

| | | | |
|---|---|---|---|
| 4,385,301 | A | 5/1983 | Tricoles et al. |
| 4,746,924 | A | 5/1988 | Lightfoot |
| 5,241,313 | A | 8/1993 | Shaw et al. |
| 5,315,307 | A | 5/1994 | Tsui et al. |
| 2002/0002066 | A1 * | 1/2002 | Pallonen ................ 455/562 |
| 2005/0007278 | A1 * | 1/2005 | Anson et al. ............ 342/451 |
| 2006/0087475 | A1 | 4/2006 | Struckman ............. 342/451 |
| 2008/0186235 | A1 * | 8/2008 | Struckman et al. ..... 342/465 |
| 2009/0079634 | A1 | 3/2009 | Rose |
| 2010/0321240 | A1 | 12/2010 | Dusaitis et al. |
| 2010/0321242 | A1 * | 12/2010 | Robinson et al. ....... 342/445 |
| 2011/0150504 | A1 | 6/2011 | Ellis et al. |
| 2011/0206090 | A1 | 8/2011 | Kubrak et al. |
| 2012/0033768 | A1 | 2/2012 | Chang et al. |

OTHER PUBLICATIONS

Melvin, William. "Application of STAP in Advanced Sensor Systems," Presented at RTO SET Lecture Series on Military Applications of Space Time Advanced Processing, Sep. 2002.*

* cited by examiner

*Primary Examiner* — Gregory C Issing

(74) *Attorney, Agent, or Firm* — Dilworth & Barrese, LLP; Michael J. Musella

(57) ABSTRACT

A system and method for estimating the geographic location of an RF emitter which involves spatially filtering and receiving RF signals through use of a beamforming antenna array having multiple overlapping beams; detecting and measuring the time-of-arrival and amplitude of signals which are received in each beam through use of multiple synchronized receivers; identifying simultaneous detections of the same emitter which have occurred in adjacent beams; projecting the associated beamformed antenna gain patterns onto the underlying terrain for all instances in which there was a simultaneous detection in adjacent beams; weighting and accumulating all projections to form a Maximum Likelihood Surface (MLS); and finally, estimating the location of the emitter through analysis of the resulting MLS.

20 Claims, 7 Drawing Sheets

GAIN PROJECTION GEO-LOCATION SYSTEMS AND METHODS

GOVERNMENT LICENSE RIGHTS

The invention was made with United States Government support under Contract No. W911QY-08-D-0015 awarded by The United States Department of the Army. The United States Government has certain rights in this invention.

TECHNICAL FIELD

This disclosure relates to systems and methods for locating a radio frequency (RF) emitter, and more particularly, to systems and methods for locating a radio frequency (RF) emitter without the use of phase coherent receivers.

BACKGROUND OF THE INVENTION

Determining the location of radio frequency (RF) and/or electromagnetic radiation emitters has long been a need in military and commercial applications. RF emitters can be included in missile guidance systems and wireless communications systems. RF emitters transmit RF radiation to reflect from a target or carry information. Typically, in order to determine the location of the RF emitter from a single moving platform, interferometer-based geo-location techniques are utilized. Systems using the interferometer techniques employ multiple phase coherent receivers to measure differential phase of an electromagnetic wave as it impinges upon an array of antennas. These coherent receivers are complex and expensive.

This disclosure describes an improvement over these prior art systems.

SUMMARY OF THE INVENTION

One embodiment of the invention is a method for estimating the geographic location of an RF emitter which involves spatially filtering and receiving RF signals through use of a beamforming antenna array having multiple overlapping beams; detecting and measuring the time-of-arrival and amplitude of signals which are received in each beam through use of multiple synchronized receivers; identifying simultaneous detections of the same emitter which have occurred in adjacent beams through use of a processor; projecting by the processor the beamformed antenna gain patterns onto the underlying terrain for all instances in which there was a simultaneous detection in adjacent beams; weighting and accumulating by the processor all projections to form a Maximum Likelihood Surface (MLS); and estimating by the processor the location of the emitter through analysis of the resulting MLS.

Another embodiment of the invention is a system for estimating the geographic location of an RF emitter, which includes a beamforming antenna array exhibiting multiple overlapping beams for spatially filtering and receiving RF signals; multiple synchronized receivers for detecting and measuring the time-of-arrival and amplitude of signals received in each beam; a GPS/INS for determining the position and attitude of the antenna array at the time of signal reception; and a processor for identifying simultaneous detections of the emitter which have occurred in adjacent beams, projecting beamformed antenna gain patterns onto the underlying terrain for when there is a simultaneous detection in adjacent beams, weighting the projected patterns and then accumulating them to form a Maximum Likelihood Surface (MLS), and finally, estimating the location of the emitter through analysis of the resulting MLS.

Yet another embodiment of the invention is a processor which includes a detection search module that receives time-stamped amplitude measurements of signals received in different beams of a beamforming antenna array and identifies simultaneous detections of the same emitter having occurred in adjacent beams; a search grid generation module effective to extracting a grid of localized terrain elevation over which the emitter is expected to be; an antenna gain projection module effective to project beamformed antenna gain patterns onto the underlying search grid for all instances in which there was a simultaneous detection in adjacent beams; a weight and accumulate module effective to receive the projected gain patterns, weigh each projection based on the associated amplitude measurement, and accumulate the weighted projections to form a Maximum Likelihood Surface (MLS); and a peak search module effective to determine a peak within the MLS and output geographical coordinates associated with the peak.

BRIEF DESCRIPTION OF THE DRAWINGS

The drawings constitute a part of the specification and include exemplary embodiments of the present invention and illustrate various objects and features thereof.

Like reference numerals indicate similar parts throughout the figures.

DETAILED DESCRIPTION OF THE PREFERRED EMBODIMENT(S)

Figure 1:
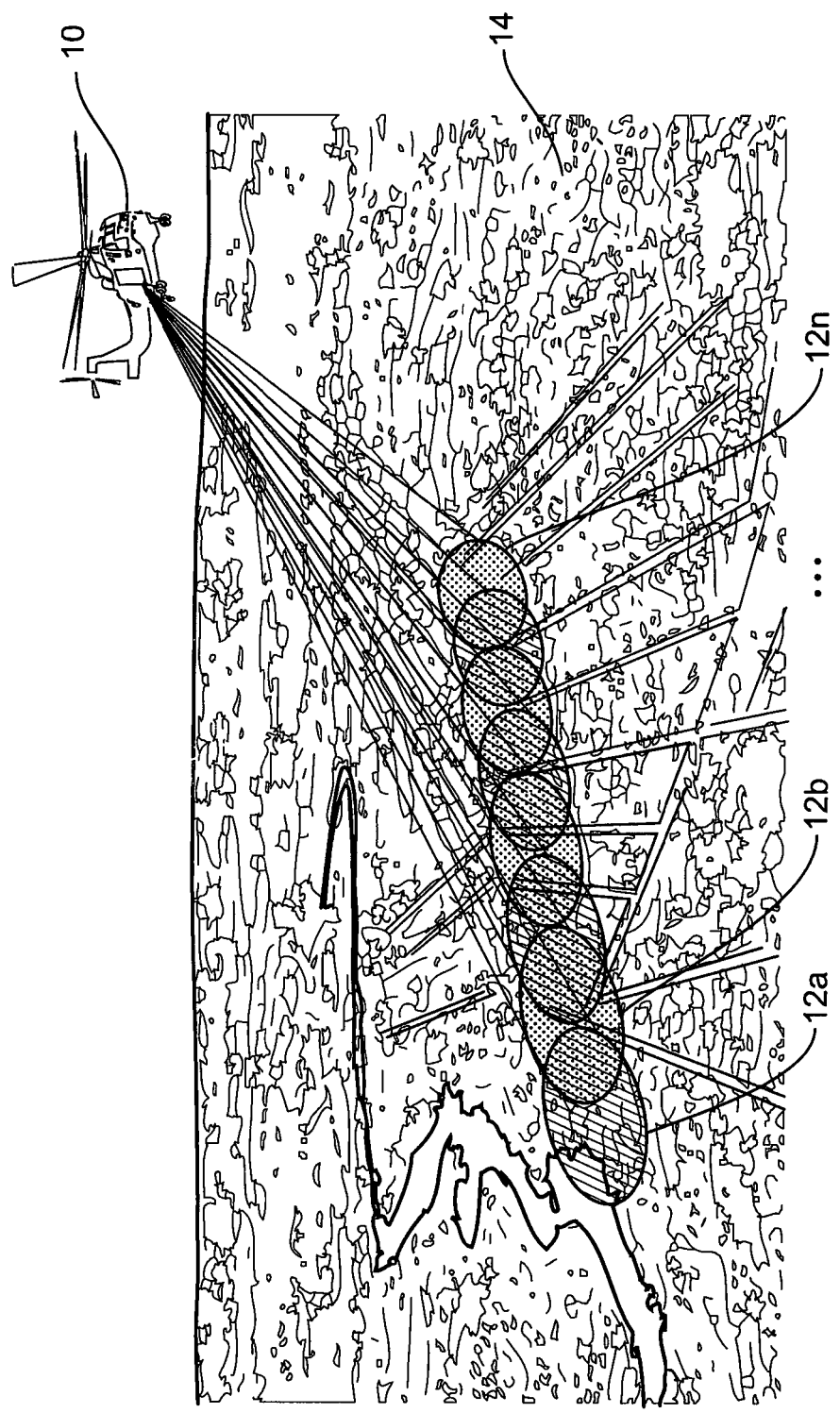
FIG. 1 is a diagram illustrating a system for gain projection geo-location in accordance with the present disclosure.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Prior art techniques for determining the location of an emitter from a single platform relied on conventional interferometer-based geo-location techniques that required the use of phase coherent receivers. These phase coherent receivers are complex and expensive.

The present disclosure solves these problems and provides systems and methods for determining the geographic location of an electromagnetic or radio frequency (RF) emitter from an airborne platform without the use of phase coherent receivers. This can be achieved through the analysis of a maximum likelihood surface formed by multiple projections of beamformed antenna gain patterns onto the underlying terrain.

It is desirable to achieve the ability to geo-locate a certain emitter of interest at low cost and reduced processing resources. Readily available and inexpensive receivers that do not provide coherent phase data can be used in place of the more expensive phase coherent receivers and without the need for conventional interferometer-based geo-location techniques. The present disclosure incorporates a receive antenna array with multiple narrow beams and estimates the emitter's location based on amplitude measurements from different receiver-beam pairs.

FIG. 1 is a diagram illustrating a system for Gain Projection Geo-Location (GPGL) in accordance with the present disclosure. Shown in FIG. 1 is an airborne platform 10 (illustrated as a helicopter) installed with the gain projection geo-location system of the present disclosure. The gain projection geo-location system estimates the geographic location of an emitter from airborne platform 10 through the analysis of multiple projections of beamformed antenna gain patterns onto the underlying terrain 14. The influence of side-lobe detections on geo-location accuracy is minimized by employing a receive antenna array having multiple overlapping narrow beams 12a-12N, and carefully selecting the times and locations at which projections are triggered. A projection is triggered whenever it is determined that an emitter has been detected simultaneously in adjacent beams, and that the measured amplitudes are balanced (for example, within 3 dB of each other). Detections that meet the Simultaneous-Adjacent-Balanced (SAB) criteria are a strong indicator that the emitter was located in the main-lobe of the associated beams at the time of detection, and not located in the side-lobes of said beams. Furthermore, since adjacent beams are spatially overlapped, it is likely that the emitter is located in the intersection of the main-lobes, reducing the instantaneous Area Error Probability (AEP) to approximately half of the main-lobe footprint.

The number of beams 12a-12N, beam characteristics, and the beam arrangement is determined based on specific applications and/or mission requirements. For example, employing wider beams 12a-12N offers the advantages of increased instantaneous search area, longer time-on-target, and relatively low side-lobe levels, at the cost of reduced gain and greater Area Error Probability (AEP). As another example, employing narrower beams 12a-12N offers the advantages of smaller AEP, and increased gain, at the cost of higher side-lobe levels, smaller instantaneous search area, and shorter time-on-target.

The beams 12a-12N can have varying arrangements. For example, as shown in FIG. 1, the beams 12a-12N can be arranged in a linear configuration perpendicular to the aircraft track to maximize instantaneous search area. In other examples, the beams can be arranged in a linear configuration parallel to the aircraft track to maximize time-on-target or arranged in an alternative configuration (i.e. box, diamond) to achieve a compromise. Whichever configuration is used based on the mission requirements, the beams 12a-12N should be spatially overlapped, as this effectively reduces the instantaneous AEP to be smaller than the main-lobe footprint, and helps in identifying and discounting side-lobe detections. Overlapping the beams effectively generates a single, narrower beam (and hence smaller AEP) without increasing the physical dimensions of the antenna array. The amount of overlap should be tailored to the mission requirements. A nominal overlap percentage of 50% is recommended as it offers the best compromise between AEP and overall coverage area relative to the size of the array. A smaller overlap percentage (<50%) offers the advantage of a smaller AEP, at the cost of coverage gaps and smaller overall coverage area (sum of all overlap areas). A larger overlap percentage (>50%) is not recommended, as it offers little improvement in AEP at the cost of overall coverage area.

Figure 2:
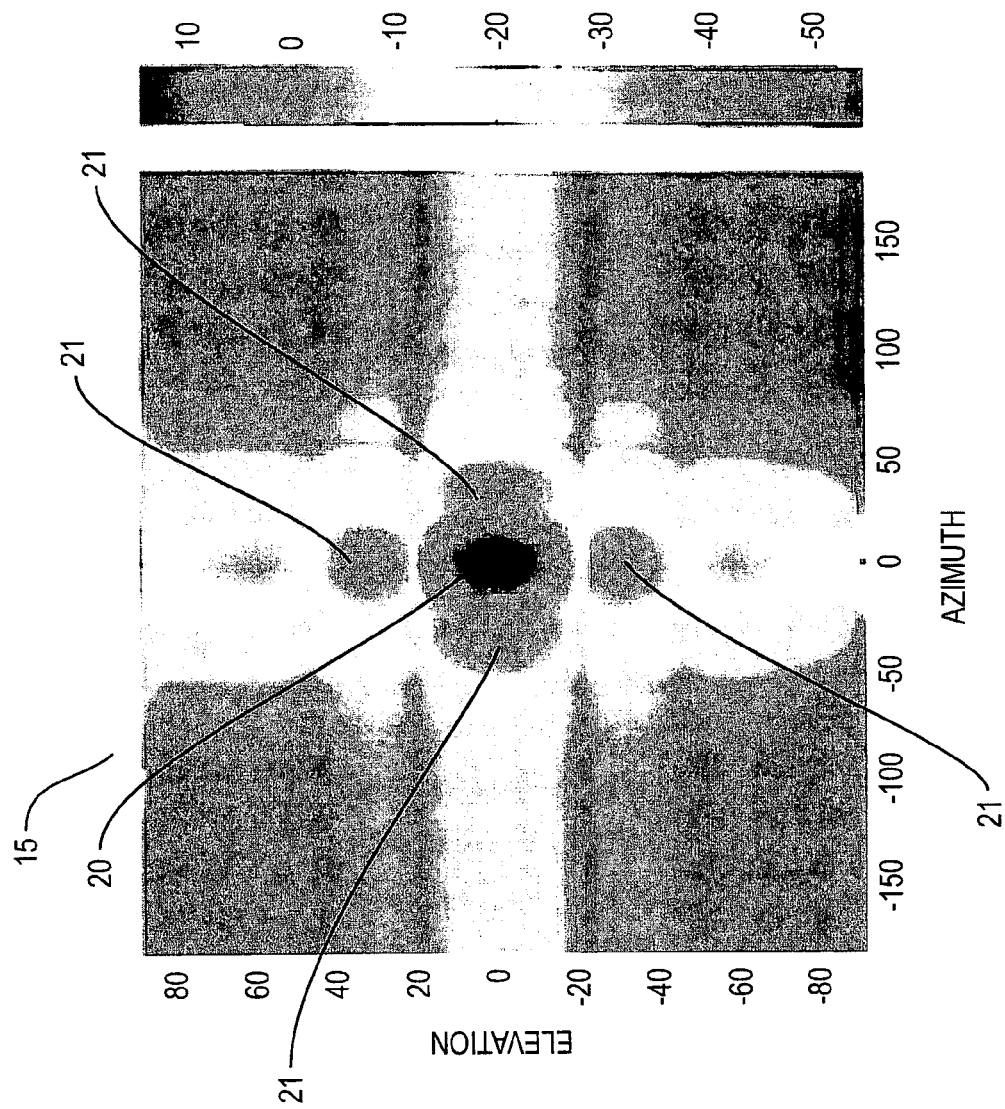
FIG. 2 is a beamformed antenna gain pattern versus azimuth and elevation in accordance with the present disclosure.

In designing the optimal system for specific applications, the gain pattern of each beam 12a-12N must be characterized as a function of azimuth and elevation. The receive antenna array is typically characterized inside an anechoic chamber prior to being installed on the aircraft. The receive antenna array is mounted inside the chamber on a pedestal which rotates in both azimuth and elevation. A signal is transmitted at the receive antenna array from a stationary transmit antenna (also located inside the chamber). The signal is received by the array and the amplitude is measured at each output port (one port for each beam). The gain for each beam is then computed by taking into account the received amplitudes, known path losses, and known transmit power. Gain is then saved to a database which is organized by beam/port, frequency, azimuth angle, and elevation angle. An example gain pattern is depicted in FIG. 2. The gain pattern 15 shows amplitude as a function of azimuth and elevation. As can be seen in FIG. 2 the gain pattern 15 has a main lobe 20 and multiple side lobes 21.

Signals-of-interest are detected by the synchronized receivers as the beams pass over the terrain. Each receiver measures the time-of-arrival and amplitude of each signal. This information is sent downstream to the Simultaneous-Adjacent-Balanced (SAB) search function, which attempts to identify simultaneous detections of the same emitter that have occurred in adjacent beams and register balanced amplitudes (i.e. within 3 dB of each other). The SAB search function was intended to work with the overlapping beams primarily to improve geo-location accuracy by only triggering projections when the emitter is in the intersection of two main-lobes. The SAB search function offers the added benefit of computational efficiency by not triggering computationally-expensive projections when the emitter is in a side-lobe.

Figure 3:
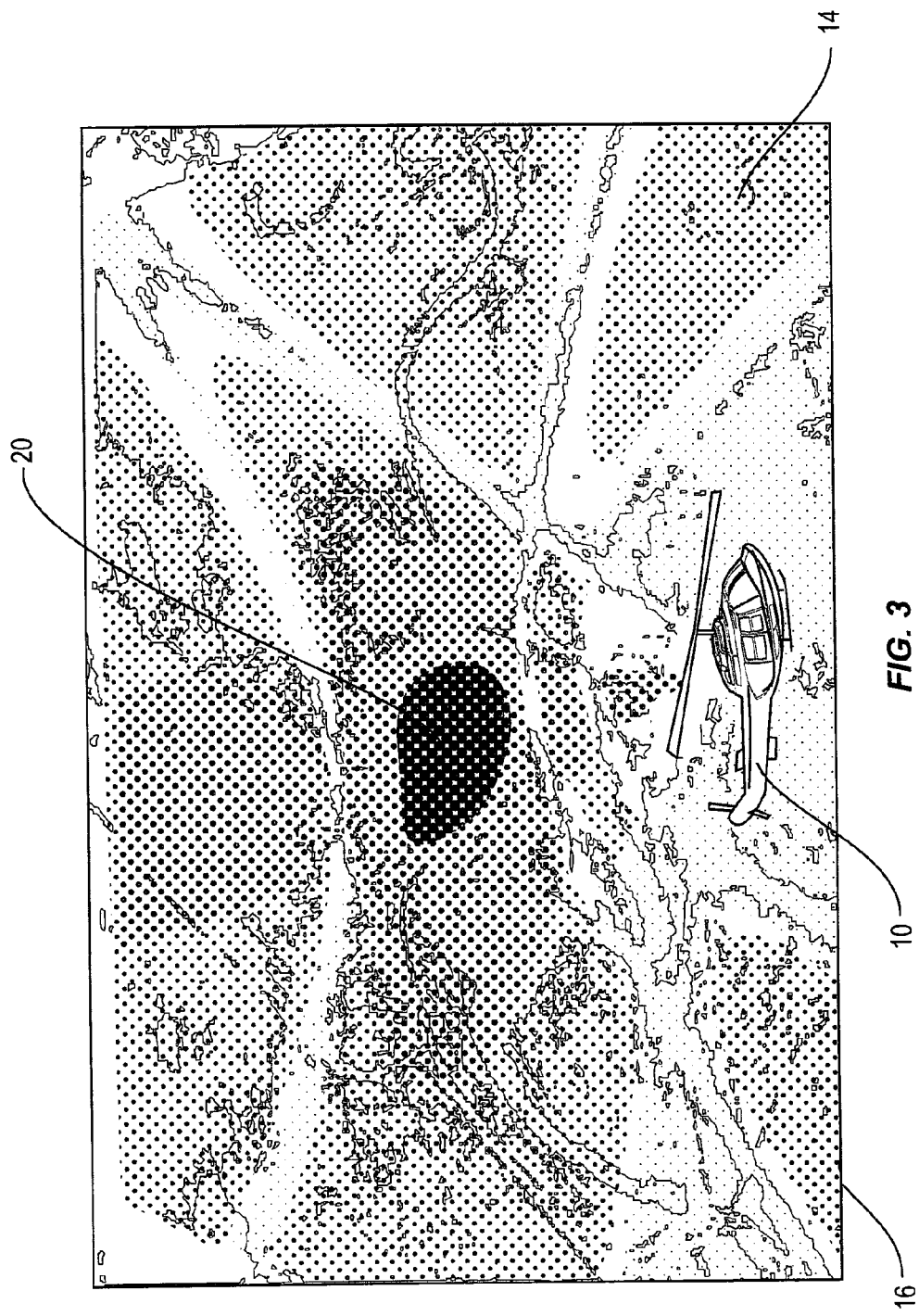
FIG. 3 is a beamformed antenna gain pattern as projected onto a search grid in accordance with the present disclosure.

Each time a SAB is identified, the associated gain patterns are projected onto the underlying terrain. For example, if a signal-of-interest was simultaneously detected in beams 1 and 2 with balanced amplitudes, the gain patterns for beams 1 and 2 would be projected onto the underlying terrain. In order to bound the projection processing, the gain patterns are projected onto a finite search grid below the aircraft area of operation. An example projection is shown in FIG. 3, as an example gain pattern 15 is projected onto an example search grid. Although the search grid 16 is defined herein as a search area below the aircraft area of operation, other search areas and therefore search grids are contemplated.

The ground elevation in the search area must be determined prior to projecting the gain patterns. One method of determining the elevation is through the use of Digital Terrain Elevation Data (DTED). The DTED standard, developed by the National Imagery and Mapping Agency (NIMA), is a uniform matrix of terrain elevation values which provides basis quantitative data for systems and applications that require terrain elevation, slope and/or surface roughness information. Other methods of determining elevation are contemplated. The DTED data is interpolated to define an elevation for each latitude/longitude pair in the search grid.

In addition to determining the ground elevation for all points in the search grid, during operation of the gain projection geo-location system, the position and attitude of the airborne platform 10 must be taken into account at the time of projecting a gain pattern. This is required as the position and attitude of the airborne platform 10 directly affect the location and distortion of the beam footprint on the underlying terrain 14. Similarly, any fixed attitude bias that may exist between the antenna array and the aircraft's Inertial Navigation System (INS) must also be taken into account. First, the true azimuth and elevation angles from the aircraft position to each point in the search grid are computed. The azimuth and elevation angles are then multiplied by rotation matrices, which effectively rotate the angles so that they are relative to the reference plane of the array (versus being relative to True North and horizon). The rotation matrices include the instantaneous heading, pitch, and roll of the aircraft, which are measured by an INS, as well as any fixed attitude biases that may exist between the array and INS (measured at the time of array installation). Since the azimuth and elevation angles are now relative to the array, a simple look-up table or interpolation scheme can be implemented so as to map the correct gain value to each point in the search grid. A pattern projection is complete once all points in the grid have been assigned a gain value. The rotated azimuth and elevation angles can then be reused for projecting the patterns of other beams/ports that were part of the SAB detection.

Figure 4:
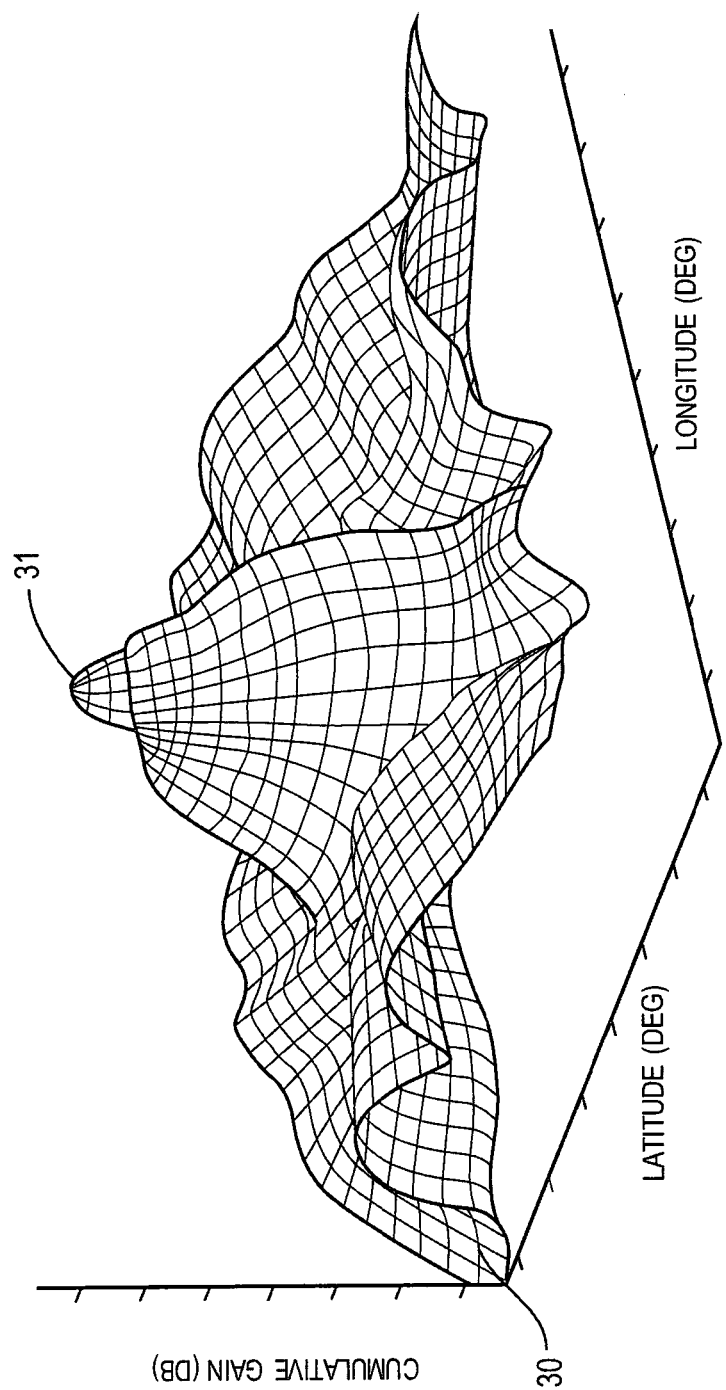
FIG. 4 is a Maximum Likelihood Surface (MLS) generated in accordance with the present disclosure.

As the gain projection geo-location system continues to detect signals and project gain patterns onto the underlying terrain, multiple projections from different beams, times, and locations are achieved. As shown in FIG. 4, the multiple projections are then accumulated to form a Maximum Likelihood Surface (MLS) 30. It should be noted that gain values can only be accumulated if they correspond to the same geographical location, hence, in order to simplify the MLS generation process, it is preferred that the same search grid be utilized for all projections. An MLS as used herein is a surface that develops when the cumulative gain of the accumulated projections is graphed as a function of geographical coordinates, i.e. latitude and longitude. As the MLS continues to accumulate additional projections over time, a peak 31 converges within the MLS, and the corresponding latitude/longitude is selected as the estimated geographic location of the emitter. It should be noted that a separate MLS is generated for each unique emitter, so as to prevent projections associated with one emitter from influencing the location estimate of a different emitter.

Figure 5:
FIG. 5 is a diagram illustrating the estimated geo-location of an emitter and associated Area Error Probability (AEP) in accordance with the present disclosure.

The Area Error Probability (AEP) is shown in FIG. 5. The AEP 40 is defined as the area of the contour of the MLS at a predetermined level. In the event that the MLS does not exceed the predetermined threshold, the system will not report a geo-location estimate, as additional detections/projections are needed. The level can be adjusted as required by the system application. For example, in a system that is applied to determine the location of a military target, the level might be increased to minimize the error probability, whereas in a system applied to determine the location of a transmit antenna in a cellular communication system, the level might be decreased, as a greater error probability may be tolerated. Though it is possible to geo-locate the emitter with only a single detection, multiple detections from different vantage points in most cases will result in a sharper peak and hence improved geo-location accuracy.

An abundance of side-lobe detections may induce false peaks within the MLS, and so it is preferred that side-lobe detections not be used to trigger projections and/or during the MLS generation process. In an optimal system, only main-lobe detections are used to trigger projections and build the MLS. This technique requires that neighboring beams be spatially overlapped. This pairing will be further described below.

Yet another method for reducing the effects of side-lobe detections is to weight each individual projection based on the measured amplitude before accumulating. This ensures that higher amplitude detections (main-lobe) will have a stronger influence on the MLS than lower amplitude detections (side-lobe).

The AEP reducing processes described herein can be used individually or in varying combinations to produce optimum results. Other AEP reduction processes are contemplated.

Figure 6:
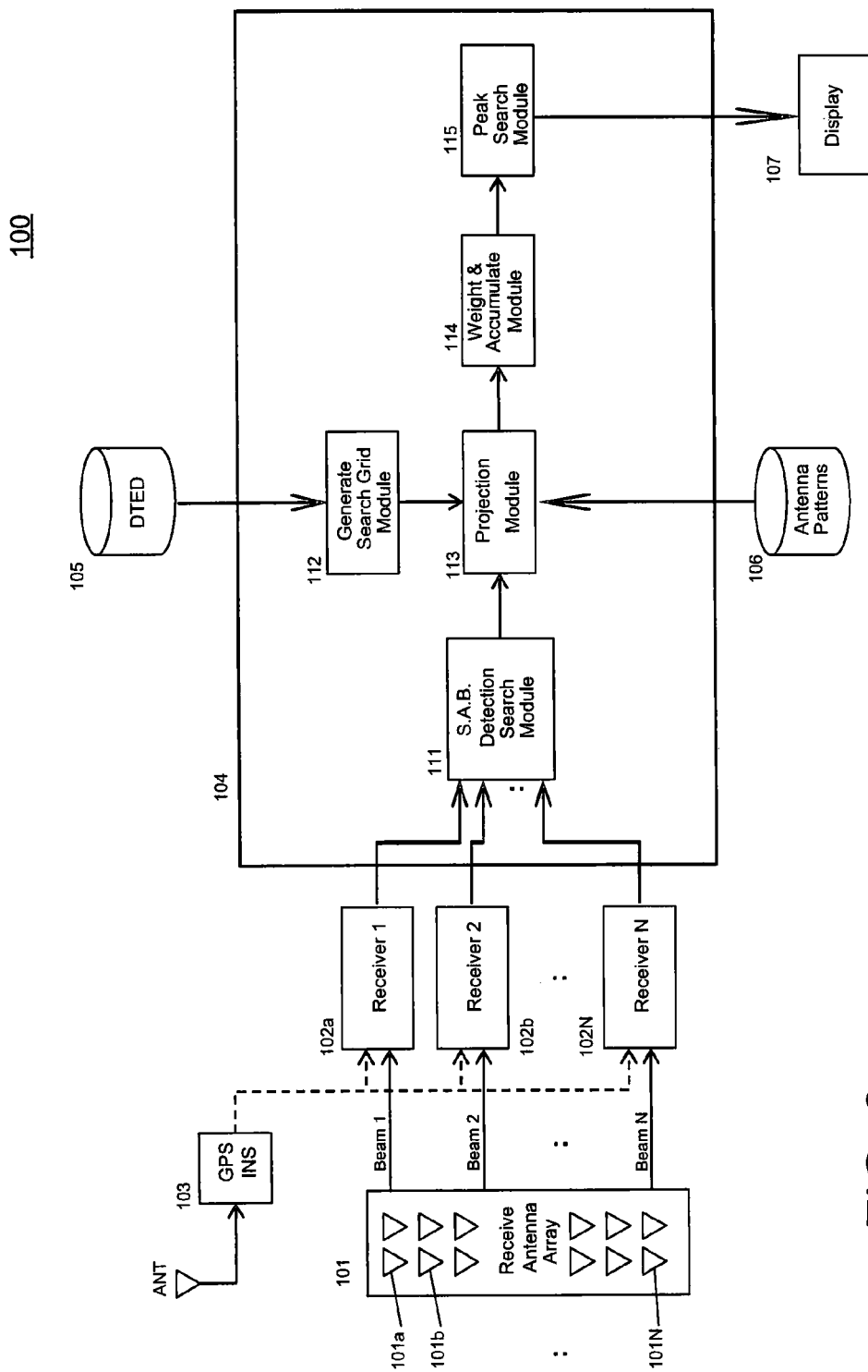
FIG. 6 is a block diagram illustrating a gain projection geo-location system in accordance with the present disclosure.

FIG. 6 is a block diagram illustrating a gain projection geo-location system in accordance with the present disclosure. Gain projection geo-location system 100 includes beamforming antenna array 101. Antenna array 101 includes a plurality of antennas 101a-101N and beamforming network. Each beamformed antenna output port 101a-101N is connected to a respective receiver 102a-102N. Also connected to receivers 102a-102N is Global Positioning System (GPS)/Inertial Navigation System (INS) 103. GPS/INS 103 is connected to antenna ANT. The GPS section of GPS/INS 103 receives GPS signals to resolve the current time and position of the platform; the INS section of the GPS/INS 103 resolves the attitude. As one or more antennas 101a-101N receive signals from an emitter the beamformed outputs Beam 1-Beam N are forwarded to respective receivers 102a-102N. Receivers 102a-102N can contain their own processors (not shown) or can be under control of system processor 104. Either way, receivers 102a-102N detect and measure the time-of-arrival and amplitude of any signals-of-interest that may be present in each beam (Beam 1-Beam N). In addition, the receivers associate the position and attitude of the aircraft at the time-of-arrival with each received signal. The time-of-arrival, amplitude, position, and attitude information for the received signals are forward to processor 104.

Also included in gain projection geo-location system 100 are DTED memory 105, antenna pattern memory 106 and display 107. DTED memory 105 stores DTED elevation datasets as described above. Antenna patterns memory 106 stores information related to the gain of each beamformed antenna output Beam 1-Beam N as a function of frequency, azimuth and elevation. Although shown as separate elements, DTED memory 105 and antenna pattern memory 106 can be contained in one memory unit.

Processor 104 includes several modules to perform the processes as described above. In particular, processor 104 includes Simultaneous Adjacent Balanced (SAB) Detection Search Module 111, Generate Search Grid Module 112, Projection Module 113, Weight and Accumulate Module 114 and Peak Search Module 115. Other modules and variations thereof are contemplated.

As stated above, one process that can be utilized by gain projection geo-location system 100 to improve geo-location accuracy is to filter out all single-beam and side-lobe detections, with the intention of only triggering projections and accumulating the MLS when the emitter is in the intersection of two main-lobes. Doing so results in a smaller AEP, as the intersection of two adjacent beams is smaller than that of a single beam. Furthermore, filtering out side-lobe detections is essential because side-lobe detections could potentially induce false peaks within the MLS, which could result in an incorrect geo-location estimate. It is possible to determine if a given emitter is inside the intersection of two adjacent beams when receivers which are processing signals from adjacent beams detect simultaneous signal transmissions that have similar amplitudes. This process is performed by the SAB Detection Search Module 111. Processor 104 receives the time-of-arrival, amplitude, and beam number for the received signals and compares the information to determine if any SAB signal pairs exist. Only signals that have search pairs are used during the remaining processes. It should be noted that any given signal can belong to more than one pair. As stated above, this process is not required, but greatly improves geo-location accuracy when utilized.

As signal pairs are identified, the time-of-arrival, amplitudes, position, and attitude information is forwarded to the Projection Module 113. The gain patterns associated with the signal pairs are retrieved from memory and projected onto the search grid from the location of the platform at the time-of-arrival of the signals. The search grid is generated in Generate Search Grid Module 112. The search grid is a matrix of latitude and longitude pairs that is associated with the terrain elevation in the predetermined search area. As described above, the terrain elevation is determined using the information stored in the DTED memory 105. Antenna patterns memory 106 stores, for each beam/frequency combination, the raw gain pattern as a function of azimuth and elevation. The information stored in the antenna patterns memory 106 is used by the Projection Module 113 during the projection process. Upon receiving a SAB pair, the Projection Module 113 retrieves the raw gain data (both beams, single frequency) from antenna patterns memory 106. In the likely event that the measured (detected) frequency does not exactly match any of the frequencies over which the antenna array was calibrated at, the closest frequency is used. The raw gain patterns are then projected onto the search grid as described above.

In the Weight and Accumulate Module 114, each projection is weighted by amplitude. Weighting is yet another method for reducing the influence of side-lobe detections on geo-location accuracy. During the weighting process, the projected gain pattern is multiplied by a weighting factor which is derived from the measured amplitude (the greater the amplitude, the greater the weight, and vice-versa). This ensures that higher amplitude detections (main-lobe) will have a stronger influence on the MLS than lower amplitude detections (side-lobe). As the weighted projections are received they are accumulated into the maximum likelihood surface or MLS. Processor 104 then searches, in Peak Search Module 115, for a peak that develops as the MLS is updated with the accumulating projections. The peak represents the location of the emitter. The coordinates of the emitter can be output by processor 104.

Display 107 is used to display the various stages of the process for a visual representation of the projected gain patterns and/or the MLS mapped to the search grid as well as for the estimated emitter location displayed on a map with or without a representation of the airborne platform 10.

Figure 7:
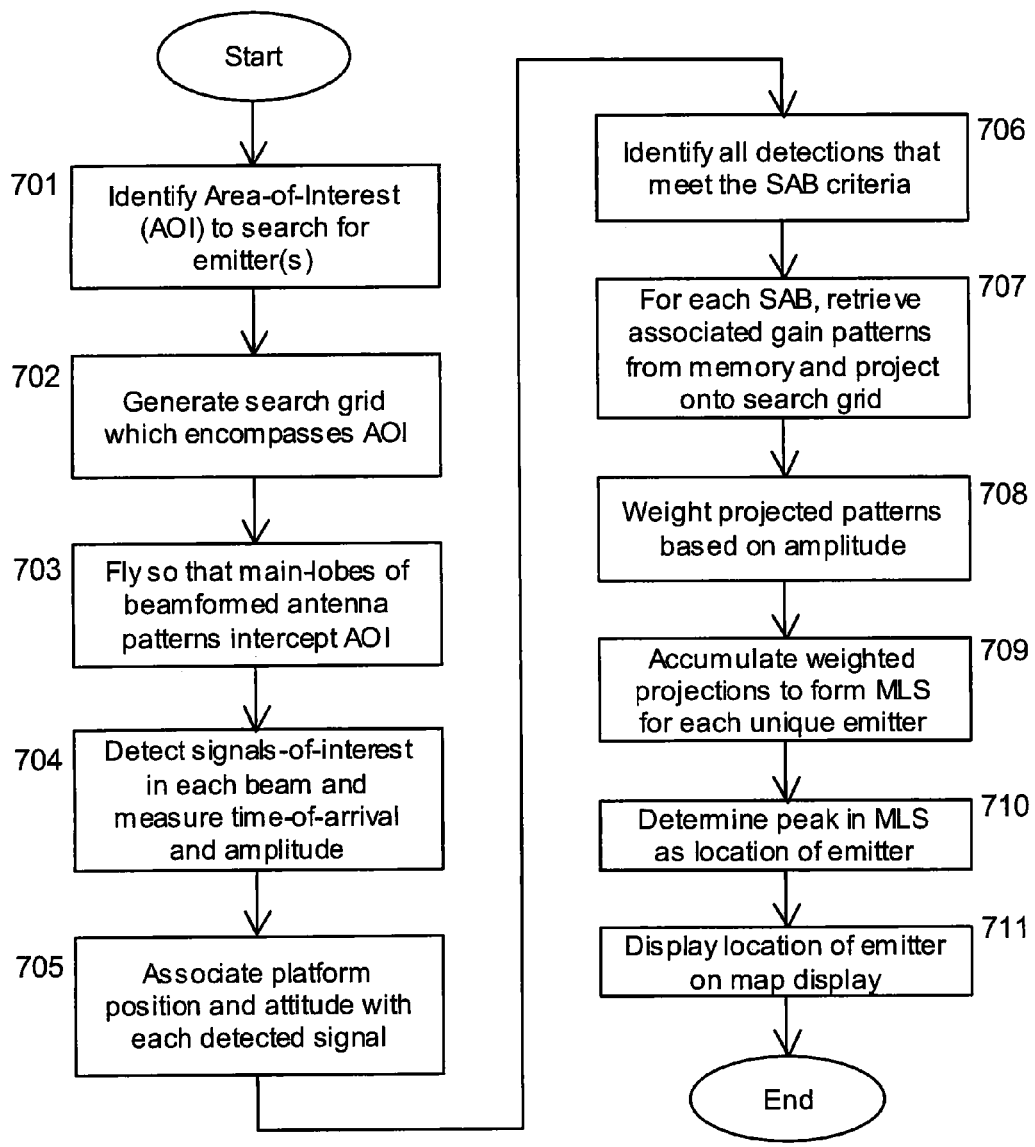
FIG. 7 is a flow chart illustrating a method for gain projection geo-location in accordance with the present disclosure.

FIG. 7 is a flow chart illustrating a method for gain projection geo-location in accordance with the present disclosure.

In step 701, the operator identifies an Area-of-Interest (AOI) to search for emitters (for example, an N×N km section of a city). This information is input into the system, which generates a search grid to be used during the mission in step 702. The search grid consists of a matrix of uniformly spaced latitude and longitude pairs and associated terrain elevation data, which can be derived using DTED. The resolution of the search grid (i.e. 10×10 meters) is driven by a combination of factors including the size of the AOI, size of the beam footprints, and available processing resources (finer resolution results in more points in the search grid, which results in more computations). In step 703, the aircraft flies over the AOI in such a manner that allows the main-lobes of the beamformed antenna array to intercept the AOI. The flight profile most likely consists of a raster pattern which allows the entire AOI to be covered over time via multiple passes. It should be noted that the operator may alter the flight path during the mission to revisit higher-priority (target-rich) areas within the AOI to acquire more signal intercepts from different vantage points to achieve more accurate geo-location estimates.

As the main-lobes of the beamforming antenna array 101a-101N traverse across the AOI, signals-of-interest are detected by receivers 102a-102N. In step 704, the receivers measure the time-of-arrival and amplitude of each signal. In step 705, the platform position and attitude are associated with each signal detection. As stated above, the time, position, and attitude information is attained from the onboard GPS/INS 103. Although the time-of-arrival measurement must be performed by the receivers, the position and attitude association can optionally be performed at a later time by the processor 104.

In step 706, processor 104 searches the incoming detections for simultaneous detections of the same emitter that have occurred in adjacent beams and register balanced amplitudes (SAB search). As stated above, although an optional step, the processes of determining signal pairs improves the geo-location accuracy of the system by only triggering projections when the emitter is in the intersection of two main-lobes, and by minimizing the influence of side-lobe detections on the MLS. The SAB search function offers the added benefit of improved efficiency by not triggering computationally-expensive projections when the emitter is in a side-lobe.

In step 707, processor 104 retrieves those gain patterns from antenna patterns memory 106 which are associated with the given SAB, and then projects each of the patterns onto the search grid as described. In step 708, processor 104 weights the raw gain patterns according to the measured amplitude values as described above. In step 709, processor 104 accumulates multiple weighted projections to form an MLS for each emitter as described above.

In step 710, processor 104 searches the MLS for a peak that develops as the surface is updated with the accumulating projections as described. In step 711, processor 104 determines the longitude and latitude of the MLS peak and outputs the coordinates, for example on display 107.

As stated above the output of the coordinates can be in numerical format, or processor 104 can display on display 107 the results as an AEP overlay on a map of the search area, with or without a representation of the airborne platform 10. Multiple signal detections over time from different vantage points in most cases will result in a sharper peak in the MLS and hence improved geo-location accuracy.

Although the present disclosure has been described in terms of military applications, other applications are contemplated. For example, in a cellular communication system, locating an emitter is often a desired process, to which the present disclosure can be applied. Other applications are also contemplated.

While the invention has been described with reference to a number of exemplary embodiments, it will be understood by those skilled in the art that various changes can be made and equivalents can be substituted for elements thereof without departing from the scope of the invention.

In addition, many modifications can be made to adapt a particular situation or material to the teachings of the invention without departing from essential scope thereof. Therefore, it is intended that the invention not be limited to any particular exemplary embodiment disclosed herein.

What is claimed is:
1. A method for estimating the geographic location of a Radio Frequency (RF) emitter, comprising the steps of:
   spatially filtering and receiving RF signals by a beamforming antenna array having multiple overlapping beams;

detecting and measuring by a plurality of synchronized receivers the time-of-arrival and amplitude of signals which are received in each beam;

identifying by a processor simultaneous detections of the same emitter which have occurred in adjacent beams;

projecting by the processor the beamformed antenna gain patterns onto an underlying terrain for all instances in which a simultaneous detection in adjacent beams occurs;

weighting and accumulating by the processor all projections to form a Maximum Likelihood Surface (MLS); and estimating by the processor the location of the emitter through analysis of the MLS.

2. The method of claim 1, further comprising:
comparing by the processor RF signals received in all beams to determine if there exists any signal pairs occurring in adjacent beams which exhibit simultaneous times-of-arrival and similar amplitudes; and pairing by the processor the times, amplitudes, position, and attitude of Simultaneous-Adjacent-Balanced (SAB) signal pairs.

3. The method of claim 2, further comprising discarding all signal detections that do not belong to an SAB pair.

4. The method of claim 1, wherein the MLS is generated as a function of latitude and longitude, and is created through accumulation of the projected gain patterns.

5. The method of claim 1, further comprising:
compensating for the instantaneous attitude of the aircraft and fixed attitude biases that may exist between an Internal Navigation System (INS) and the antenna array.

6. The method of claim 2, further comprising:
generating a search grid based on a pre-defined geographical area-of-interest and associated terrain elevation data; and projecting the beamformed antenna gain patterns onto the search grid from the location at which an associated SAB pair was detected.

7. The method of claim 6, further comprising displaying the projected gain patterns and the search grid on a display.

8. The method of claim 1, further comprising:
receiving Global Positioning System (GPS) and Inertial Navigation System (INS) information; and associating the instantaneous position and attitude of the aircraft with each signal detection based on said GPS and INS information.

9. The method of claim 1, further comprising:
mapping the estimated location of the emitter on a map;
mapping a location of the receiver on the map; and
displaying on a display the mapped location of the emitter and the receiver.

10. A system for estimating the geographic location of a Radio Frequency (RF) emitter, comprising:
a beamforming antenna array exhibiting multiple overlapping beams for spatially filtering and receiving RF signals;

a plurality of synchronized receivers for detecting and measuring a time-of-arrival and an amplitude of signals received in each beam;

a Global Positioning System/Inertial Navigation System (GPS/INS) module for determining the position and attitude of the antenna array at the time of signal reception; and a processor for identifying simultaneous detections of an emitter which have occurred in adjacent beams, projecting beamformed antenna gain patterns onto the underlying terrain for all instances of a simultaneous detection in adjacent beams, weighting the projected patterns, accumulating the weighted patterns to form a Maximum Likelihood Surface (MLS), and estimating the location of the emitter through analysis of the resulting MLS.

11. The system of claim 10, wherein the processor is further configured to:
compare RF signals received in all beams to determine if there exists any signal pairs occurring in adjacent beams which exhibit simultaneous times-of-arrival and similar amplitudes;

identify the beams which exhibit simultaneous times-of-arrival and similar amplitudes as Simultaneous-Adjacent-Balanced (SAB) signal pairs; and pair the times, amplitudes, position, and attitude of the SAB signal pairs.

12. The system of claim 11, wherein the processor is further configured for discarding all signal detections that do not belong to an SAB pair.

13. The system of claim 10, wherein the processor is further configured to compensate for an instantaneous attitude of the aircraft and fixed attitude biases that exist between an Internal Navigation System (INS) and the antenna array.

14. The system of claim 11, wherein the processor is further configured to generate a search grid based on a pre-defined geographical area-of-interest and associated terrain elevation data, and projecting the beamformed antenna gain patterns onto the search grid from a location at which the associated SAB pair was detected.

15. The system of claim 14, further comprising a display for displaying the projected gain patterns and search grid.

16. The system of claim 10, further comprising a Global Positioning System (GPS) and Inertial Navigation System (INS), used for associating the instantaneous position and attitude of the aircraft with each signal detection.

17. The system of claim 10, wherein the processor is further configured to map the determined location of the emitter on a map and map a location of the receiver on the map, the system further including a display for displaying the mapped locations of the emitter and the receiver.

18. A system for estimating the geographic location of a Radio Frequency (RF) emitter, comprising:
a detection search module effective to receive time-stamped amplitude measurements of signals received in different beams of a beamforming antenna array and identify simultaneous detections of an emitter having occurred in adjacent beams as Simultaneous-Adjacent-Balanced (SAB) signal pairs;

a search grid generation module effective to extract a search grid of localized terrain elevation over which the emitter is expected;

a projection module effective to project beamformed antenna gain patterns onto the search grid when a simultaneous detection in adjacent beams is identified;

a weight and accumulate module effective to receive the projected gain patterns, weight each projection based on the associated amplitude measurement, and accumulate the weighted projections to form a Maximum Likelihood Surface (MLS); and a peak search module effective to determine a peak within the MLS and output geographical coordinates associated with the peak.

19. The system of claim 18, further comprising a simultaneous-adjacent-balanced (SAB) detection search module effective to compare RF signals received in beams to identify signal pairs occurring in adjacent beams which exhibit simultaneous times-of-arrival and similar amplitudes, and pair the times, amplitudes, position, and attitude of any simultaneous-adjacent-balanced (SAB) signal pairs.

20. The system of claim 18, further comprising a display to display the geographical coordinates output from the peak search module.

* * * * *